United States Patent [19]

Kiselnikov et al.

[11] 4,426,507

[45] Jan. 17, 1984

[54] PROCESS FOR PRODUCING (CO)-POLYMERS FROM $\alpha,\beta$ UNSATURATED ACID DERIVATIVES

[76] Inventors: Valentin N. Kiselnikov, ulitsa Pushkina, 2, kv. 1; Arkady A. Shubin, 4 Letny pereulok, 4, kv. 4; Vladislav V. Vyalkov, ulitsa Lezhnevskaya, 124-a, kv. 30; Vitaly A. Kruglov, ulitsa Parizhskoi Kommuny, 22, kv. 97; Tamara F. Loginova, ulitsa Pushkina, 47, kv. 56; Viktor S. Romanov, ulitsa Prostornaya, 15, kv. 42; Lev N. Ovchinnikov, ulitsa F. Engelsa, 117, kv. 9, all of Ivanovo; Valentin I. Varlamov, pereulok Shkolny, 2/38, kv. 88; Jury A. Makarov, pereulok Zhukovskogo, 3, kv. 19, both of Dzerzhinsk Gorkovskoi oblasti; Evgeny I. Penkov, prospekt Dzerzhinskogo, 4, kv. 44; Galina N. Shvareva, prospekt Pobedy, 16-a, kv. 41, both of Dzerzhinsk Gorkovskoi oblasti; Vladimir N. Shtefan, ulitsa F. Engelsa, 22, kv. 17, Gorky, all of U.S.S.R.

[21] Appl. No.: 243,923

[22] Filed: Feb. 19, 1981

[51] Int. Cl.$^3$ .................... C08F 22/02; C08F 22/14; C08F 22/38

[52] U.S. Cl. ........................... 526/303.1; 526/75; 526/240; 526/287; 526/307.3; 526/307.6; 526/307.7; 526/312; 526/317; 526/329.7; 528/502

[58] Field of Search ............ 526/240, 287, 307.3, 526/307.6, 312, 329.7, 75; 528/502

[56] References Cited

U.S. PATENT DOCUMENTS

| | | | |
|---|---|---|---|
| 3,879,357 | 4/1975 | Wingler et al. | 526/65 |
| 3,957,739 | 5/1976 | Cabestany et al. | 526/307.6 |
| 4,268,400 | 5/1981 | Lucas et al. | 526/307.6 |
| 4,306,045 | 12/1981 | Yoshida et al. | 526/307.6 |

OTHER PUBLICATIONS

Riddle, Monomeric Acrylic Esters, Reinhold Publishing Corp., (1954), p. 2.

*Primary Examiner*—Harry Wong, Jr.
*Attorney, Agent, or Firm*—Lilling & Greenspan

[57] ABSTRACT

The process comprises (co)polymerization of the starting monomers in the presence of radical initiators at monomer concentrations of from about 40 to about 100% by mass at the temperature of decomposition of the initiator employed until the appearance of the gel-effect and formation of a low-molecular prepolymer. The prepolymer is cooled to the glass-transition temperature with a degree of conversion thereof of about 50 to 90%. The resulting high-molecular prepolymer is granulated and treated with a heating agent in a pneumatic conveyor, cyclone, fluidized bed and filtering bed.

15 Claims, No Drawings

PROCESS FOR PRODUCING (CO)-POLYMERS FROM α,β UNSATURATED ACID DERIVATIVES

FIELD OF THE INVENTION

The present invention relates to the production of polymeric materials and, more specifically, to processes for producing polymers of the acrylic series and mainly water-soluble polymers.

BACKGROUND OF THE INVENTION

Polymers of the acrylic series possess a whole range of promising properties such as transparency, high mechanical strength, ageing-resistance, emulsifying and coagulating properties and other valuable characteristics. For this reason, demand for these polymers is continuously growing simultaneously with stricter requirements imposed on the quality of these polymers. This gives an impetus for the elaboration of numerous processes for the production of polymers and copolymers of the acrylic series.

Known in the art are methods for obtaining polymers and copolymers of the acrylic series by the reaction of (co)polymerization in bulk, or solutions which are divided into the varnish method in the case where the starting monomers and the resulting (co)polymer are soluble in the solvent, and the suspension method in the case where the monomer and the reaction product are insoluble in the solvent. The suspension method is intermediate relative to the varnish and emulsion methods.

It is also known to produce polymers by way of (co)polymerization of the starting monomers in the solid phase or melt, but these methods of (co)polymerization have not yet found commercial implementation.

The reaction of (co)polymerization in bulk or in aqueous solutions enjoys extensive commercial application. In the majority of cases, the processes are commercially implemented discontinuously and less frequently—continuously. This is due to the multi-stage character of the manufacture of the final product. Thus, the process for the manufacture of such polymeric materials involves the following stages: (co)polymerization, granulation, drying and crushing or (co)polymerization, washing, centrifugation or filtration and, when required, crushing which is performed in the above-indicated sequence.

Polymers of the acrylic series are produced mainly by the suspension method in reactors with thermostatted jackets provided with stirring means. Polymerization is effected at a monomer concentration of 15% in a solution of inflammable and explosive toxic solvents. In these processes 6 tons of organic-containing waste waters are obtained per ton of the final product which necessitates special measures for their utilization. In certain cases the quality of the obtained product does not meet the requirements specified by the customer.

Known is a process for the production of water-soluble powder-like (co)polymers by way of spraying a rubber-like (co)polymer with a concentration above 20% into a medium consisting of water and an organic solvent (cf. Japanese Pat. No. 48-9576, published in 1973). This manner of polymerization of the monomers results in a higher quality of the final product. However, the presence of an organic solvent in the system eventually results in the formation of considerable amounts of organic-containing waste waters and does not improve working conditions for the operating personnel.

Water-soluble (co)polymers based on acrylamide and acrylic acid are produced in the solid state by the emulsion method (cf. British Pat. No. 1,319,632 published 1973). The process of (co)polymerization of aqueous solutions of the monomers is carried out in a water-oil emulsion in the presence of an organic hydrophobic liquid forming an azeotropic mixture with water. The final stage of the process is the removal of water from the product by way of azeotropic distillation. The presence of residual water in the product, as well as the use of the water-oil emulsion and organic liquid causes contamination of the end product with these components, thus substantially lowering the process efficiency.

Polymers of methacrylic acid esters are produced in a film-type reactor provided with a stirring means, wherein the reaction occurs in a film flowing down along the reactor walls (cf. Japanese Pat. No. 47-16173 published 1972). This process being highly effective, however, makes it possible to obtain the products only in the liquid state. In the treatment of high-viscosity solutions which adhere to the apparatus walls, difficulties associated with agitation of the reaction medium occur.

Copolymers comprising water-soluble macromolecular acrylic gels are produced in a vertical cylindrical polymerizer with its inner surface coated by a resin to facilitate the removal of the product (cf. Japanese Pat. No. 49-36954, published 1974). The process steps are carried out in the following sequence. The starting components are charged into a polymerizer and a heating agent is fed into the jacket to control the polymerization temperature. The copolymerized mass is discharged through the opened lower bottom of the polymerizer. The rubber-like product is further subjected to granulation and drying. In this process, it is impossible to use high concentrations of the starting monomers, since it results in the formation of a solid product which is difficult to remove from the apparatus. Furthermore, high concentration of the components causes the evolution of great amounts of heat which does not make it possible to use large-diameter apparatus.

Known in the art is a batch-wise process for the production of water-soluble polymers in a cylindrical reactor elongated in the direction of its axis, wherefrom the product is discharged by means of a piston (cf. FRG Pat. No. 1,218,157 published 1971). The reactor operates under substantially adiabatic conditions. In this process only small concentrations (20-40%) of the components can be used. The product comprises a rubber-like mass which is substantially impossible to process by cutting. This mass is then subjected to vacuum drying. The use of high concentrations of the starting monomers is associated with difficulties in moving the polymerizate in the apparatus and removal of the heat liberated in the reaction of copolymerization.

Known is a continuous process for producing a polymer from polymerizable ethylenically unsaturated compounds (cf. British Pat. No. 1,062,980 published 1967). It is carried out in a tubular reactor with forced feeding under a pressure of from 10 to 1,000 atm and at a temperature within the range of from 100° to 300° C. To obtain the product with a uniform molecular mass, the molten polymer is subjected to shear stresses and the volatile components are removed from the polymerized product in the outgassing zone. The process continuity is its advantage. However, the use of high pressures of up to 1,000 atm and further reduction thereof to 1-100 mm Hg is associated with certain difficulties. The product is subject to thermal destruction. Therefore it is obtained at a temperature below the melting point which, in turn, causes difficulties in its movement in the apparatus in the solid state. Using low concentrations of the monomers, it is possible to produce a rubber-like substance, but its disintegration is also associated with certain difficulties and necessitates an additional drying operation.

Known in the art is a continuous process for the production of a water-soluble polymer (cf. French Pat. No. 2,104,041 published 1972). This process is performed in an apparatus comprising a mixer for the starting components, an elongated reactor with drawing rolls mounted in its lower section, a granulator and a belt conveyor blown over with air to prevent granules from clogging. The starting components are fed into the mixer having an impeller of a vane or any other type. After vigorous stirring, the reaction mass is fed into an elongated reactor of round, square or any other cross-section, wherein at ⅓ of the reactor height a zone of intensive polymerization is formed due to the evolving heat of polymerization. In the course of movement of the reaction mass towards the drawing rolls, the polymerization reaction is completed and the product is cooled to ambient temperature.

The product is then drawn by rolls into a granulator, disintegrated and delivered onto a belt conveyor. Therefrom, granules are fed to drying. In this process the product is obtained at low (below 40%) concentrations of the starting monomers. The use of higher concentrations is associated with difficulties in the removal of heat formed in the reaction of polymerization and displacement of the material in the apparatus.

Known in the art is also a process for the production of water-soluble polymers, wherein no organic-containing waste waters are formed. The polymer is obtained by spraying the reaction mixture in the presence of initiators with the boiling point above 100° C. (cf. U.S. Pat. No. 3,644,305 published 1973). In the process, use is made of a reaction mass with a concentration of the starting components of 30% by mass. The product is very soluble in water and the degree of conversion in its manufacture is 99%. However, the product has a low molecular mass.

It follows from the foregoing analysis of the prior art that the known processes for the production of (co)-polymers do not make it possible to obtain a product which meets growing customer requirements.

DISCLOSURE OF THE INVENTION

The present invention is directed to the provision of new steps in a process for polymerization of the acrylic series monomers in the presence of radical-type initiators which would make it possible to improve the product quality, reduce the process duration and lower power consumption.

This object is accomplished by a process for producing polymers of the acrylic series involving polymerization of the starting monomers in the presence of radical initiators, granulation of the product and drying thereof, wherein according to the present invention, polymerization of the starting monomers is conducted under a total concentration thereof not below 40% by mass at the temperature of decomposition of the initiator employed until the appearance of the gel-effect. Thereafter, the mass is cooled to the glass-transition temperature of the polymer with a degree of conversion thereof of 50 to 90% and the resulting prepolymer is granulated and dried by successive treating with a heating agent under the conditions of pneumotransport, cyclone, fluidized and filtering beds.

It is advisable to carry out fluidized-bed drying at a temperature within the range of from 40° to 140° C., and filtering-bed drying at a temperature of from 25° to 60° C.

The process according to the present invention has the following advantages:

It makes possible to:

(1) improve quality of the desired product characterized by a degree of conversion of 90 to 99.8%, viscosity of 1% aqueous solution of 40 to 434 cSt, moisture content of from 5 to 15%;

(2) reduce the total duration of the manufacture of the final product;

(3) eliminate the formation of waste waters;

(4) eliminate the use of explosive and inflammable solvents;

(5) improve working conditions for the operating personnel;

(6) improve protection of the environment.

The process for the production of polymers of the acrylic series can be commercially implemented in an apparatus comprising a mixer for the preparation of the reaction mixture, a polymerization reactor, a granulation means and a combined drier incorporating a pneumatic conveyor, cyclone and fluidized-bed and filtering-bed apparatus. The starting monomers can be acrylic acid and methacrylic acids, their salts, esters, amides and other similar compounds. Amides of acrylic and methacrylic acids can both be used per se, and in combination with other substances called amide masses which are obtained in the production of amides. The use of such amide masses is economically efficient, since it does not require isolation of an amide in its pure form.

The radical initiators can be any initiator employed for polymerization of the above-indicated monomers such as inorganic and organic peroxy compounds (potassium persulphate, ammonium persulphate, ammonium persulphate, hydrogen peroxide, di-tert. butyl peroxide, cumene hydroperoxide, benzoyl peroxide and the like). For the preparation of the reaction mass the starting monomers should be employed in concentrations of not less than 40% by mass. This requirement should be obeyed for solid monomers which are to be converted to the liquid state. For this purpose it is advisable to use water as a solvent.

As regards liquid monomers, their total concentration can be 100%. This means that they can be used per se, without any solvent. At such high concentrations of the starting monomers it is possible to obtain a high-quality product after polymerization. For example, the degree of conversion is as high as 99.8%. In the case of polymerization of the above-indicated monomers at a concentration below 40% by mass, i.e. under conditions violating the principle of the present invention, the desired quality of the product is not attained. According to the present invention, polymerization or copolymerization of the monomers should be carried out at a temperature corresponding to the temperature of decomposition of the initiator employed for the polymerization and this temperature has to be maintained until the gel-effect appears, i.e. the reaction of polymerization should be conducted under isothermal conditions. Violation of these temperature conditions will result in strong heating of the mixture which is intolerable. As soon as the appearance of the gel-effect is noticed, the reaction temperature is lowered until loss of mobility of the reaction mass occurs, i.e. to the glass-transition temperature of the polymer. This is necessary to stop the formation of new centers of polymerization and direct the process towards the growth of the polymer chain, thus contributing to the formation of a high-molecular product. The polymerization continues and the degree of conversion is increased to a value within the range of from 50 to 90% (depending on the nature of the employed monomer and its initial concentration). In the case of violation of this process step, only low-molecular products are obtained.

The following step of the process according to the present invention is granulation. An important feature of the process of this invention is that the granulation is carried out with a incompletely polymerized mass, i.e. prepolymer. This prepolymer is easy to granulate and it requires lower rates of power consumption as compared to crushing of the solid fully polymerized product.

The resulting granules of the prepolymer are subjected to drying which, according to the present invention, is carried out by way of treatment with a heating agent successively under conditions of pneumatic transport, cyclone fluidized bed and filtering bed.

Under pneumatic transport conditions, the mass transfer of granules of the prepolymer by a stream of a heating agent should be understood as the conditions under which the ratio between the volume occupied by the heating agent to the volume of granules of the prepolymer is equal to or close to one (1).

Under cyclone conditions, the separation of the vortex stream of the heating agent and granules of the prepolymer under the effect of centrifugal force should be understood.

Under fluidized-bed conditions the state of a mixture of the heating agent and the prepolymer granules similar to the state of a boiling liquid shall be understood as the state at which the ratio between the volume occupied by the heating agent to the volume of the bed of granules of the prepolymer is within the range of from 0.5:1 to 0.85:1.

Under filtering bed conditions, the state of a mixture of the heating agent and the prepolymer granules preceding the state of a fluidized bed should be understood as the state wherein the ratio between the volume occupied by the heating agent to the volume of the bed of the prepolymer granules is within the range of from 0.4:1 to 0.5:1.

The heating agent can be air or an inert gas.

Under conditions of pneumatic transport and cyclone, a dry product is deposited onto wet granules of the prepolymer. At the same time, the removal of free moisture from granules of the prepolymer takes place. Under conditions of pneumatic transport and cyclone use is made of the heating agent leaving the fluidized-bed apparatus. As a result of such treatment the prepolymer granules acquire properties of a bulky material, whereafter they are delivered to the fluidized bed apparatus. Therein the prepolymer granules are treated with the heating agent at a temperature within the range of from 40° to 140° C. Adsorption moisture is thus removed from the prepolymer granules. From the fluidized-bed apparatus the prepolymer granules are delivered into a filtering-bed apparatus, wherein they are treated with the heating agent at a temperature within the range of from 25° to 60° C. As a result of such treatment the osmotically-combined moisture is removed from the granules.

During the successive treatment of the prepolymer granules under conditions of pneumatic transport, cyclone, fluidized bed and filtering bed, the polymerization continues and polymeric chains are growing and getting longer. This process of (co)polymerization is completed only in the filtering bed, wherefrom the final product is withdrawn as a commercial product. The product obtained by the process according to the present invention is of high quality and has the following characteristics: degree of conversion—90-99.8% viscosity of 1% solution in water—40 to 434 cSt, moisture content—5 to 15%. To dissolve the polymerization product no addition of an alkali is required, thus increasing its practical advantages.

The process according to the present invention can be implemented both continuously and batch-wise. The preferred embodiment of the present invention is continuous manner of carrying out the process.

Best Mode for Carrying-Out the Invention

The process for the production of polymers of the acrylic series is effected by way of successively carrying out the following operations. A reaction mass is prepared by mixing the starting monomers and initiators. The total concentration of the monomers should be maximal depending on the solubility of the monomers employed, but not less than 40%.

The monomers are employed either as their aqueous solutions or per se. In the former case the amount of the monomer is determined by its solubility in water at a temperature not exceeding the temperature of the beginning reaction of copolymerization. In the latter case, i.e. the use of liquid monomers or monomers having a good solubility of one monomer in another, their total concentration in the reaction mass can be 100%. The use of such high concentrations of the starting monomers ensures high quality of the final product and eliminates the formation of waste waters. It also eliminates the use of organic solvents thus lowering the explosiveness and inflammability of the materials during the polymerization process. The initiator is selected depending on its solubility in the monomers or water and the rate of initiation. Furthermore, the initiator should not contaminate the final product.

Mixing of the above-mentioned components can be carried out in a conventional mixer provided with an agitation means and a thermostatting jacket.

The prepared reaction mixture is continuously fed into a reactor, wherein it is polymerized at the temperature of the reaction mass equal to the temperature of decomposition of the initiator. This temperature of the reaction mass is maintained until the appearance of the gel-effect. A prepolymer is thus obtained with a degree of conversion specific for each particular polymer. For example, in the production of a copolymer of methacrylic acid amide and sodium salt of methacrylic acid (MAA+Na-salt of MA) the degree of conversion at this stage shall be 30 to 35%. Then the temperature of the reaction mixture is lowered to the glass-transition temperature of the polymer, preferably to 34°-35° C. This cooling is carried out in such a manner that by the moment of reaching this temperature the prepolymer would have a degree of conversion within the range of from 50 to 90%, i.e. it could be suitable for granulation. This step-wise character of the operation of the production of the prepolymer prevents spontaneous elevation of the reaction mass temperature resulting in the formation of a low-molecular polymer and thermal destruction of the components of the reaction mixture—the starting monomers, the resulting polymer and ensures the formation of a high-molecular product, since cooling in the second step stops the formation of new centers of polymerization, thus activating the chain propagation of the polymer. The best conditions for such two-step operation are ensured in an "ideal-displacement" apparatus. The resulting prepolymer is granulated. Granulation of the prepolymer, i.e. incompletely polymerized reaction mass, makes it possible to lower the rates of power consumption and shorten the entire duration of the whole process. The resulting prepolymer granules are dried by way of successively treating them with a heating agent under the conditions of pneumatic transport, cyclone, fluidized and filtering beds. To this end, the prepolymer granules are continuously supplied into a unit comprising a pneumatic conveyor, a cyclone and fluidized-bed and filtering-bed apparatus. In the pneumatic-transport means and cyclone, the granules are coated with a dry (co)polymer to prevent their aggregation and predried by means of the heating agent—air or an inert gas.

For this purpose use is made of the spent heating agent leaving the fluidized-bed apparatus thus utilizing its energy and heat, whereby power and heat expenses are substantially reduced. This makes it also possible to ensure a high efficiency of dust collection due to aggregation of the entrained particles, i.e. the product particles carried away from the fluidized bed by the heating agent, and granules of a wet prepolymer. The thus-treated prepolymer granules are then dried in two stages—first under the conditions of the fluidized bed at a temperature of 65°–70° C. and then in the filtering bed at a temperature of 25°–40° C. The treatment of these granules under such thermal and hydrodynamic conditions varying from more severe to milder conditions is necessary for the manufacture of a high-quality product, since elimination of moisture from the product and further chain propagation take place during this treatment. Drying of the prepolymer granules makes it possible to lower the rate of power consumption at this stage. This can be explained by the fact that as a result of the ongoing reaction of (co)polymerization from the prepolymer, heat is liberated which contributes to the removal of the solvent therefrom, thus lowering the additional heat supply with the heating agent.

The process according to the present invention makes it possible to obtain a product having a degree of conversion of from 90 to 95%, viscosity of 1% aqueous solution of 180–200 cSt, and moisture content of No addition of an alkali is required for dissolution of the product. The product prepared by the conventional suspension method is soluble only in an aqueo-alkaline solution so that its degree of conversion is not above 90%, viscosity of 1% aqueous solution—60 cSt, moisture content—60%.

EXAMPLE 1

Preparation of a copolymer of methacrylic acid amide (MAA) and sodium salt of methacrylic acid (Na-salt of MA)

Into a mixer there are fed 284 g/hr of methacrylic acid, an aqueous solution of sodium hydroxide (caustic soda) with a concentration of 17.6% in the amount of 728.3 g/hr and 288 g/hr of methacrylic acid amide. The temperature during mixing of these components in the mixer is maintained at 55° to 58° C.

The thus-prepared mixture of the monomers is continuously supplied into a reactor at the rate of 1,300.3 g/hr under a pressure of about 3 atm. Into the reactor an aqueous solution of an initiator—potassium persulphate ($K_2S_2O_8$) with a concentration of 1.78% is fed in an amount of 69.54 g/hr. The total concentration of the starting monomers (MAA+Na-salt of MA) in the reaction mass is 47% by mass. The mass is copolymerized at a temperature within the range of from 55° to 65° C. for 9 minutes until the gel-effect is observed, the degree of conversion being equal to 30–35%. Thereafter the reaction mixture is cooled to a temperature of 34° C. where glass-transition of the polymer starts. During this cooling, copolymerization continues and upon achievement of a conversion degree of 65% the resulting prepolymer is delivered into a granulator.

The prepolymer granules (with a size of from 3 to 5 mm) are then delivered into a drying unit comprising a pneumatic conveyor, a cyclone and fluidized-bed and filtering-bed apparatus. In the pneumatic conveyor and cyclone a dry copolymer (copolymer of amide of methacrylic acid and Na-salt of methacrylic acid) is applied onto the prepolymer granules by means of a heating agent—air—supplied at a rate of 20–30 m/sec in the pneumatic conveyor and 14–20 m/sec in the cyclone. This operation is necessary to prevent granules from aggregation and for entraining the dusty product from the spent heating agent.

The thus-treated granules of the prepolymer are dried first at a temperature within the range of from 65° to 70° C. in a fluidized bed created by the same heating agent supplied at the rate of 2.25 m/sec to a degree of conversion of 75–88% and moisture content of 20–25%, followed by drying in a filtering bed also created by the same heating agent at a speed of 1.02 m/sec and at a temperature of 25° to 40° C. till completion of the copolymerization reaction.

The copolymerization product leaving the filtering-bed apparatus is a commercial product. The degree of conversion is 90–95%, viscosity of 1% aqueous solution of 180–200 cSt and moisture content of from 8 to 15%.

The product prepared by the conventional suspension method has a degree of conversion not exceeding 90%, viscosity of 1% aqueous solution of 60 cSt and moisture content of 60%.

EXAMPLE 2

Preparation of a copolymer of methacrylic acid amide (MAA) and ammonium salt of methacrylic acid ($NH_4$ salt of MA)

Into a mixer there are fed 1087 g/hr of an amide mass containing 5% of methanol, 8% of free ammonia and 25% of methacrylic acid amide (MAA) and 283 g/hr of methacrylic acid (MA). During mixing of the starting components the temperature in the mixer is maintained at 35°–38° C.

The resulting mixture of the monomers is continuously fed into a reactor in the amount of 1337.4 g/hr under a pressure of about 3 atm. Into the same reactor an aqueous solution of potassium persulphate ($K_2S_2O_8$) with a concentration of 3.17% is fed in the amount of 32.6 g/hr. The total concentration of the starting monomers in the reaction mass (MAA+$NH_4$-salt of MA) is equal to 42% by mass.

Thereafter this mass is copolymerized at a temperature of 35°–38° C. for 25 minutes till the appearance of the gel-effect. The degree of conversion is equal to 40–45%. Afterwards the reaction mass is cooled to a temperature of 25°–28° C., whereupon glass-transition of the copolymer starts. During this cooling the copolymerization continues and reaches a degree of conversion of 73–76%. The resultant prepolymer is fed into a granulator.

The prepolymer granules with a size of 3 to 5 mm are fed into a drying unit comprising a pneumatic transport, cyclone, and apparatus of fluidized and filtering beds. In the pneumatic transport means and cyclone the operation of application of the dry copolymer of the same composition as the desired one is effected by means of a heating agent—air—supplied at the rate of 20–30 m/sec in the pneumatic transport means and 14–20 m/sec in the cyclone. This operation is necessary to prevent the granules from aggregation and entrain the dusty product from the spent heating agent.

The thus-treated prepolymer granules are dried first at a temperature of 40°–45° C. in a fluidized bed created by the same heating agent at the rate of 2.25 m/sec to a degree of conversion of 85–87% and moisture content of 20–21%, and then in a filtering bed created by the same heating agent at a temperature of from 25° to 30° C. at the rate of 1.02 m/sec till the completion of the polymerization reaction.

The copolymerization product leaving the filtering-bed apparatus is a commercial product having the following characteristics: degree of conversion—89–90%, viscosity of 1% aqueous solution—40–45 cSt, moisture content—13–14%.

EXAMPLE 3

Preparation of a copolymer of methacrylic acid amide (MAA) and Na-salt of methacrylic acid (Na-salt of MA)

Into a mixer there are supplied 260 g of methacrylic acid (MAA) and an aqueous solution of NaOH with a concentration of 28.41% in an amount of 413.6 g. Into the aqueous solution of the resulting Na-salt of MA there are introduced 1,000 g of an amide mass containing 5% of methanol, 8% of free ammonia and 25% of methacrylic acid amide (MAA).

The resulting mixture is evacuated under a residual pressure of 300 mm Hg at a temperature of 40° C. to remove methanol. Thereafter, the temperature in the mixer is maintained within the range of from 55° to 58° C.

The thus-prepared mixture of the monomers is continuously fed into a reactor under a pressure of about 3 atm in the amount of 1331.6 g/hr. An aqueous solution of potassium persulphate ($K_2S_2O_8$) with a concentration of 3% is also fed into the reactor in an amount of 38.4 g/hr. The total concentration of the starting monomers (MAA+Na-salt of MA) in the reaction mass is 42% by mass.

This mass is copolymerized at a temperature within the range of from 55° to 65° C. for 25 minutes till the appearance of the gel-effect. Thereafter the reaction mass is cooled to a temperature of 34° C., whereupon the glass-transition of the copolymer starts. During this cooling the copolymerization is still going on and after reaching the degree of conversion of 68–70% the resulting prepolymer is fed into a granulator.

The prepolymer granules (with a size of from 3 to 5 mm) are delivered into a drying unit comprising a pneumatic transport means, a cyclone and fluidized-bed and filtering-bed apparatus. In the pneumatic transport means and cyclone, the application of a dry copolymer of the same composition as the desired one onto the prepolymer granules is effected by means of a heating agent—air—supplied at the rate of 20–30 m/sec in the pneumatic transport means and 14–20 m/sec in the cyclone. This operation is necessary to prevent the granules from aggregation and to entrain the dusty product from the spent heating agent. The thus-treated granules of the prepolymer are dried first at a temperature of from 60° to 65° C. in a fluidized bed created by the same heating agent at its speed of 2.25 m/sec to a degree of conversion of 75–80% and a moisture content of 20–23%, then in a filtering bed created by the same heating agent at a speed of 1.02 m/sec at a temperature within the range of from 25° to 30° C. till completion of the copolymerization reaction.

The copolymerization product leaving the filtering-bed apparatus is a commercial product having a degree of conversion of 89–90%, viscosity of a 1% aqueous solution of 70–80 cSt and a moisture content of 14–16%.

EXAMPLE 4

Preparation of a copolymer of sodium salt of methacrylic acid (Na-salt of MA) and methacrylic acid (MA)

Into a mixer there are fed 547 g/hr of MA, an aqueous solution of NaOH with a concentration of 25.7% in an amount of 673 g/hr. During mixing of the starting components the temperature in the reactor is maintained at 40°–42° C. The resulting mixture of the monomers is continuously fed into a reactor under a pressure of about 3 atm in an amount of 1.220 g/hr. Also fed into the reactor are aqueous solutions of: potassium persulphate ($K_2S_2O_8$) with a concentration of 1.06% in the amount of 101.08 g/hr and sodium hydrosulphite ($Na_2S_2O_4$) with a concentration of 1.1% in an amount of 48.94 g/hr. The total concentration of the starting monomers (Na-salt of MA and MA) in the reaction mass is equal to 47% by mass.

Then this mass is polymerized at a temperature of 43°–45° C. for 30 minutes till the appearance of the gel-effect. The degree of conversion is equal to 40–45%. Thereafter the reaction mass is cooled to a temperature of 28°–30° C., whereupon the glass-transition of the copolymer starts. During this cooling the copolymerization continues and after reaching a degree of conversion of 55–60% the resulting prepolymer is fed into a granulator.

The prepolymer granules (with a size of from 3 to 5 mm) are delivered into a drying unit comprising a pneumatic transport means, a cyclone and fluidized-bed and filtering-bed apparatus. In the pneumatic transport means and cyclone the operation of application of a dry copolymer of the same composition as the desired one onto the prepolymer granules is effected by means of a heating agent—air—supplied at a speed of 20–30 m/sec in the pneumatic transport means and 14–20 m/sec in the cyclone. This operation is necessary to prevent the granules from aggregation and entrain the dusty product from the spent heating agent.

The thus-treated granules of the prepolymer are dried first at a temperature of from 50° to 55° C. in a fluidized bed created by the same heating agent at its speed of 2.25 m/sec to a degree of conversion of 80–82% and a moisture content of 22–24%, then in a filtering bed created by the same heating agent at its speed of 1.02 m/sec at a temperature of from 40° to 45° C. till completion of the reaction of copolymerization.

The copolymerization product leaving the filtering-bed apparatus is a commercial product having a degree of conversion of 93–95%, a viscosity of 1% aqueous solution of 80 to 90 cSt and a moisture content of 13–15%.

The product obtained by the conventional suspension method has a degree of conversion of not more than 90%, a viscosity of 1% aqueous solution of from 25 to 60 cSt and a moisture content of 60%.

EXAMPLE 5

Preparation of a copolymer of sodium salt of methacrylic acid (Na-salt of MA) and methylmethacrylate (MMA)

Into a mixer there are fed 502.1 g/hr of MA, an aqueous solution of NaOH with a concentration of 33.14% in an amount of 669.35 g/hr and 129.9 g/hr of MMA. During mixing of the starting components the temperature in the mixer is maintained at 58°–60° C.

The resulting mixture of the monomers is continuously fed in an amount of 1301.4 g/hr into a reactor under a pressure of about 3 atm. An aqueous solution of an initiator—potassium persulphate ($K_2S_2O_8$) is also fed thereinto with a concentration of 1.5% in an amount of 68.6 g/hr. The total concentration of the starting monomers (Na-salt of MA+MMA) in the reaction mass is equal to 54.7%.

This mass is copolymerized at a temperature of from 80° to 85° C. for 5 minutes until the appearance of the gel-effect. Thereafter the reaction mass is cooled to a temperature of 30°–35° C., whereupon the glass-transition of the copolymer starts.

During this cooling the copolymerization continues and after reaching the degree of conversion of 70–73% the thus-obtained prepolymer is fed into a granulator.

The prepolymer granules (with a size of from 3 to 5 mm) are then delivered into a drying unit comprising a pneumatic transport means, a cyclone, filtering-bed and fluidized-bed apparatus. In the pneumatic transport means and the cyclone the operation of application of a dry copolymer of the same composition as the desired one onto the prepolymer granules is effected by means of a heating agent—air—supplied at a speed of 20 to 30 m/sec in the pneumatic transport means and 14 to 20 m/sec in the cyclone. This operation is necessary to prevent the granules from aggregation and entrain the dusty product from the spent heating agent.

The thus-treated prepolymer granules are dried first at a temperature within the range of from 60° to 65° C. in a fluidized bed created by the same heating agent, i.e. air, at a speed of 2.25 m/sec to a degree of conversion of 83–85% and a moisture content of 26–28% and then in a filtering bed created by the same heating agent at a speed of 1.02 m/sec and a temperature of 38°–40° C. until completion of the reaction of copolymerization.

The copolymerization product leaving the filtering-bed apparatus is a commercial product having a degree of conversion of 93–95%, a viscosity of 1% aqueous solution of 154–160 cSt and a moisture content of 13.3–15%.

The product obtained by the conventional suspension method has a degree of conversion of 90%, viscosity of 5% aqueo-alkaline solution of 120 cSt and a moisture content of 60 to 65%.

EXAMPLE 6

Preparation of a copolymer of sodium salt of methacrylic acid (Na-salt of MA) and methylmethacrylate (MMA)

Into a mixer there are fed 439.8 g/hr of MA, an aqueous solution of caustic soda with a concentration of 33.63% in the amount of 577.7 g/hr and 284.13 g/hr of MMA. In the mixer during the stage of mixing of the starting components the temperature is maintained at 58°–60° C.

The resulting mixture of the monomers is continuously fed at a rate of 1301.4 g/hr into a reactor under a pressure of about 3 atm. Also fed thereinto is an aqueous solution of an initiator—potassium persulphate ($K_2S_2O_8$) with a concentration of 1.5% in an amount of 68.6 g/hr. The total concentration of the starting monomers (Na-salt of MA+MMA) in the reaction mixture is equal to 60.36%.

This mass is copolymerized at a temperature of from 80° to 85° C. for 20 minutes until the appearance of the gel-effect. Thereafter the reaction mass is cooled to a temperature of from 30° to 35° C., whereupon the glass-transition of the copolymer starts. During this cooling the copolymerization continues and after reaching a degree of conversion of 65–67% the resulting prepolymer is fed into a granulator.

The prepolymer granules (with a size of from 3 to 5 mm) are delivered into a drying unit comprising a pneumatic transport means, a cyclone, fluidized-bed and filtering-bed apparatus. In the pneumatic transport means and the cyclone, the operation of application of a dry copolymer (of the same composition as the desired one) onto prepolymer granules is effected by means of a heating agent—air—supplied at a speed of from 20 to 30 m/sec in the pneumatic transport means and from 14 to 20 m/sec in the cyclone. This operation is necessary to prevent the granules from aggregation and entrain the dusty product from the spent heating agent.

The thus-treated prepolymer granules are dried first at a temperature of from 60° to 65° C. in a fluidized bed created by the same heating agent at a speed of 2.25 m/sec to a degree of conversion of 78–81% and moisture content of 24–25%, then in a filtering bed created by the same heating agent at a speed of 1.02 m/sec and at a temperature of 38°–40° C. till completion of the reaction of copolymerization.

The copolymerization product leaving the filtering-bed apparatus is a commercial product and has a degree of conversion of 90.2–92%, viscosity of 1% aqueous solution of 97.7–105 cSt and a moisture content of from 14 to 15.2%.

EXAMPLE 7

Preparation of a copolymer of sodium salt of methacrylic (Na-salt of MA) and methylmethacrylate (MMA)

Into a mixer there are fed 386.1 g/hr of MA, an aqueous solution of caustic soda with a concentration of 34.25% in the amount of 498.1 g/hr and 416.6 g/hr of MMA. In the mixer during the mixing of the starting components the temperature is maintained within the range of from 58° to 60° C.

The resulting mixture of the monomer is continuously fed at a rate of 1301.4 g/hr into a reactor under a pressure of about 3 atm. Also fed into the reactor is an aqueous solution of an initiator—potassium persulphate ($K_2S_2O_8$) with a concentration of 1.5% in the amount of 68.6 g/hr. The total concentration of the starting monomers (Na-salt of MA and MMA) in the reaction mass is equal to 65.2%.

This mass is copolymerized at a temperature within the range of from 80° to 85° C. for 20 minutes till the appearance of the gel-effect. The degree of conversion is equal to 35-38%. Then the reaction mass is cooled to a temperature of 30° to 35° C., whereupon the glass-transition of the copolymer starts. During this cooling the copolymerization continues and after reaching the degree of conversion of 55-60% the resulting prepolymer is fed into a granulator.

The prepolymer granules (with a size of from 3 to 5 mm) are delivered into a drying unit comprising a pneumatic transport means, a cyclone and fluidized-bed and filtering-bed apparatus. In the pneumatic transport means and the cyclone the operation of application of a dry copolymer (of the same composition as the desired one) onto the prepolymer granules is effected by means of a heating agent—air—supplied at a speed of from 20 to 30 m/sec in the pneumatic transport means and from 14 to 20 m/sec in the cyclone. This operation is necessary to prevent the granules from aggregation and entrain the dusty product from the spent heating agent.

The thus-treated granules of the prepolymer are dried first at a temperature of 68°-70° C. in the fluidized bed created by the same heating agent at a speed of 2.25 m/sec to a degree of conversion of 75 to 79% and a moisture content of 20-21%, then in a filtering ned created by the same heating agent at a speed of 1.02 m/sec and at a temperature of 38°-40° C. till the completion of the reaction of copolymerization.

The copolymerization product leaving from the filtering-bed apparatus is a commercial product and has a degree of conversion of 93-94%, a viscosity of 1% aqueous solution of 133.9-142 cSt and a moisture content of 14-15.2%.

EXAMPLE 8

Preparation of a copolymer of methacrylic acid amide (MAA) and diethylaminoethylmethyacrylate (DEAMA) alkylated with dimethylsulphate (DMS)

Into a mixer there are fed 357.1 g/hr of DEAMA alkylated with DMS, 394.2 g/hr of MAA and 557.9 g/hr of distilled water. During mixing of the starting components the temperature in the mixer is maintained at 55°-58° C.

The resulting mixture of the monomers is continuously fed into a reactor under a pressure of about 3 atm in an amount of 1307.3 g/hr. Also fed into the reactor is an aqueous solution of an initiator—potassium persulphate ($K_2S_2O_8$) with a concentration of 3% in an amount of 62.7% g/hr. The total concentration of the starting monomers (MAA+DEAMA alkylated with DMS) in the reaction mass is 54.84% by mass.

This mass is copolymerized at a temperature of 68°-70° C. for 15 minutes till the appearance of the gel-effect. The degree of conversion is 30-32%. Thereafter the reaction mass is cooled to a temperature of 40° C., whereupon glass-transition of the copolymer starts. During this cooling the copolymerization continues and the degree of conversion reaches 55%. The resulting prepolymer is fed into a granulator.

The prepolymer granules (with a size of from 3 to 5 mm) are delivered into a drying unit comprising a pneumatic transport means, a cyclone, fluidized-bed and filtering-bed apparatus. In the pneumatic transport means and the cyclone the operation of application of a dry copolymer (copolymer of MAA+DEAMA alkylated with DMS) onto the prepolymer granules by means of a heating agent—an inert gas—nitrogen—supplied at a speed from 20 to 30 m/sec in the pneumatic transport means and from 14 to 20 m/sec in the cyclone. This operation is necessary for prevention of aggregation of the prepolymer granules and entrainment of the dusty product from the spent heating agent.

The thus-treated prepolymer granules are dried first at a temperature of from 70° to 75° C. in a fluidized bed created by the same heating agent at a speed of 2.25 m/sec to a degree of conversion of 80 to 85% and a moisture content of from 20 to 25%, then in a filtering bed created by the same heating agent at a speed of 1.02 m/sec and at a temperature of from 25° to 30° C. till completion of the reaction of copolymerization.

The copolymerization product leaving the filtering-bed apparatus requires no additional treatment, i.e. it comprises a commercial product having a degree of conversion of 98.5-99%, a viscosity of 1% aqueous solution of 23-25 cSt and a moisture content of 8 to 12%.

EXAMPLE 9

Preparation of a copolymer of methacrylic acid amide (MAA) and diethylaminoethylmethacrylate (DEAEMA) alkylated with acetic acid (AA)

Into a mixer there are fed 786.7 g/hr of DEAEMA alkylated with AA, 240.8 g/hr of MAA and 293.7 g/hr of distilled water. During mixture of the starting components the temperature in the mixer is maintained at 55°-58° C.

The resulting mixture of the monomers is continuously fed at the rate of 1318.6 g/hr into a reactor under a pressure of about 3 atm. Into the reactor is also fed an aqueous solution of an initiator—potassium persulphate ($K_2S_2O_8$) with a concentration of 5% in an amount of 51.4 g/hr. The total concentration of the starting monomers (MAA+DEAEMA alkylated with AA) in the reaction mass is equal to 75% by mass.

This mass is copolymerized at a temperature of 63°-65° C. for 10 minutes till the appearance of the gel-effect. The degree of conversion is 35-37%. Thereafter the reaction mass is cooled to a temperature of from 30° to 34° C., whereupon the glass-transition of the copolymer starts. During this cooling the copolymerization continues and after reaching a degree of conversion of 55-57% the resulting prepolymer is delivered into a granulator.

The prepolymer granules with a size of from 3 to 5 mm are delivered into a drying unit comprising a pneumatic transport means, a cyclone, fluidized-bed and filtering-bed apparatus. In the pneumatic transport means and the cyclone the operation of application of a dry copolymer (copolymer of MAA+DEAEMA alkylated with AA) onto the prepolymer granules is effected by means of a heating agent—an inert gas (nitrogen)—supplied at a speed of from 20 to 30 m/sec in the pneumatic transport means and from 14 to 20 m/sec in the cyclone. This operation is necessary to prevent the granules from aggregation and entrain the dusty product from the spent heating agent.

The thus-treated granules of the prepolymer are dried first at a temperature within the range of from 60° to 65° C. in a fluidized bed created by the same heating agent at a speed of 2.25 m/sec to a degree of conversion of 78-81% and moisture content of 18-20% and then in a filtering bed created by the same heating agent at a speed of 1.02 m/sec and at a temperature of from 25° to 30° C. till the completion of the copolymerization reaction.

The copolymerization product leaving the filtering-bed apparatus is a commercial product and has a degree of conversion of 99.5-99.8%, a viscosity of 1% aqueous solution of 90-94 cSt and a moisture content of 5 to 8%.

EXAMPLE 10

Preparation of a copolymer of methacrylic acid amide (MAA) and diethylaminoethylmethacrylate (DEAEMA) alkylated with formic acid (FA)

Into a mixer there are fed 493.2 g/hr of DEAEMA alkylated with FA, 328.8 g/hr of MAA and 480.1 g/hr of distilled water. During mixing of the starting components the temperature in the mixer is maintained at 55°-58° C.

The prepared mixture of the monomers is continuously fed at a rate of 1,300 g/hr into a reactor under a pressure of about 3 atm. An aqueous solution of an initiator—potassium persulphate ($K_2S_2O_8$)—with a concentration of 3% is also fed into the reactor at the rate of 70 g/hr. The total concentration of the starting monomers (MAA+DEAEMA alkylated with FA) in the reaction mass is 60% by mass.

This mass is copolymerized at a temperature of 60°-62° C. for 10 minutes till the appearance of the gel-effect. The degree of conversion is equal to 35-38%. Thereafter the reaction mass is cooled to a temperature of from 34° to 40° C., whereupon the glass-transition of the copolymer starts. During this cooling the copolymerization continues and when a degree of conversion of 58-60% is reached, the resulting prepolymer is delivered into a granulator.

The prepolymer granules (with a size of from 3 to 5 mm) are delivered into a drying unit comprising a pneumatic transport means, a cyclone, fluidized-bed and filtering-bed apparatus. In the pneumatic transport means and the cyclone the operation of application of a dry copolymer (copolymer of MAA+DEAEMA alkylated with FA) onto the prepolymer granules is effected by means of a heating agent—an inert gas (nitrogen)—supplied at a speed of from 30 to 20 m/sec in the pneumatic transport means and from 14 to 20 m/sec in the cyclone. This operation is necessary to prevent the granules from aggregation and entrain the dusty product from the spent heating agent.

The thus-treated granules of the prepolymer are dried first at a temperature of 63°-65° C. in a fluidized bed created by the same heating agent at a speed of 2.25 m/sec to a degree of conversion of 82-84% and a moisture content of 20 to 23% and then in a filtering bed created by the same heating agent at a speed of 1.02 m/sec and at a temperature of from 25° to 30° C. till the completion of the copolymerization reaction.

The copolymerization product leaving the filtering-bed apparatus is a commercial product and has a degree of conversion of 99.6-99.8%, a viscosity of 1% aqueous solution of 424-434 cSt and a moisture content of 10-12%.

EXAMPLE 11

Preparation of methylmethacrylate (MMA) polymer

Into a mixer there are fed 1,370 g/hr of methylmethacrylate and 3.4 g/hr of benzoyl peroxide. The reaction mass temperature is maintained within the range of from 60° to 65° C. From the mixer the reaction mass is continuously fed at the rate of 1373.5 g/hr into a reactor under a pressure of about 3 atm, wherein it is polymerized at a temperature of from 85° to 90° C. until the gel-effect is observed which corresponds to a degree of conversion of 24-27%. Thereafter the reaction mass is cooled to a temperature of 45°-50° C., whereupon the glass-transition of the polymer starts. During this cooling the polymerization continues and after reaching the degree of conversion of 60-65% the resulting prepolymer is delivered into a granulator.

The prepolymer granules (with a size of from 3 to 5 mm) are delivered into a drying apparatus comprising a pneumatic transport means, a cyclone, fluidized-bed and filtering-bed apparatus. In the pneumatic transport means and the cyclone, the operation of application of a dry polymer (polymethylmethacrylate) onto the prepolymer granules is effected by means of a heating agent—air—supplied at a speed of 20 to 30 m/sec in the pneumatic transport means and 14 to 20 m/sec in the cyclone. This operation is necessary to prevent the aggregation of granules and entrain the dusty product from the spent heating agent.

The thus-treated prepolymer granules are further polymerized first at a temperature of from 90° to 95° C. in a fluidized bed created by the same heating agent at a speed of 2.25 m/sec to a degree of conversion of 85-88%, then in a filtering bed created by the same heating agent at a speed of 1.02 m/sec and at a temperature of from 55° to 60° C. till the completion of the reaction of polymerization.

The polymerization product leaving the filtering-bed apparatus has a degree of conversion of 98-99%.

EXAMPLE 12

Preparation of diethylaminoethylmethacrylate (DEAEMA polymer)

Into a mixer there are fed 1,370 g/hr of diethylaminoethylmethacrylate and 3.4 g/hr of benzoyl peroxide. The reaction mass temperature is maintained within the range of from 55° to 60° C. From the mixer the reaction mass is continuously fed at the rate of 1373.4 g/hr into a reactor under a pressure of about 3 atm, wherein it is polymerized at a temperature within the range of from 70° to 75° C. until the gel-effect is observed which corresponds to a degree of conversion of 23 to 25%.

Thereafter the reaction mass is cooled to a temperature of from 40° to 45° C., whereupon the glass-transition of the polymer starts. During this cooling the polymerization is still going on and after reaching a degree of conversion of 68-70% the resulting prepolymer is fed into a granulator.

The prepolymer granules (with a size of from 3 to 5 mm) are delivered into a drying unit comprising a pneumatic transport means, a cyclone and fluidized-bed and filtering-bed apparatus. In the pneumatic transport means and the cyclone, the operation of application of a dry polymer (polymer of diethylaminoethylmethacrylate) onto the prepolymer granules is effected by means of a heating agent—air—supplied at a speed of from 20 to 30 m/sec in the pneumatic transport means and of from 14 to 20 m/sec in the cyclone. This operation is necessary to prevent the granules from aggregation and entrain the dusty product from the spent heating agent.

The thus-treated granules of the prepolymer are dried first in a fluidized bed at a temperature within the range of from 80° to 85° C. by means of the same heating agent at a speed of 2.25 m/sec to a degree of conversion of 86–88% and then in a filtering bed created by the same heating agent at a speed of 1.02 m/sec at a temperature of from 55° to 60° C. till the completion of the polymerization reaction.

The product of polymerization leaving the filtering-bed apparatus has a degree of conversion of 98.5 to 99.5%.

Industrial Applicability

The process according to the present invention can be used in the chemical industry in the manufacture of polymeric materials of the acrylic series. It can successfully replace the suspension method which is now the basic process for the production of the acrylic series polymers. The inventive process can be commercially implemented for the manufacture of a high-quality product regardless of whether the starting monomers are dissolved in a solvent or not.

The process for the production of polymers of the acrylic series is of commercial interest, since it enables the manufacture of various polymeric materials of high quality. The principal applications of these materials are associated with their inherent properties depending on such factors as the type of monomers, their proportions, and polymerization conditions. Such properties of copolymers and polymers of the acrylic series as transparency, weather-resistance, chemical resistance, service life, resistance against contamination, satisfactory mechanical strength and the like enable their application in civil engineering as panels, facing plates, illumination members, sanitary engineering articles and equipment for baths, glazing and the like; in electrical engineering for decorative facing of refrigerators washing machines and the like; in the aviation and automobile industries for top coating and finishing.

Water-soluble copolymers and polymers of the acrylic series are extensively employed in the following industries:

in the chemical industry as a component for the preparation of suspensions;

in the production of adhesives and ion-exchange resins as well as thickeners in the production of paints and varnishes;

in the textile industry as sizing agents for basic threads from natural and chemical fibres;

in the pulp-and-paper, coal-extraction and mining industries as a flocculation agent;

in leather manufacture as a primer for leather tanning;

in aviation as a component of antifrosting liquids;

in the treatment of waste waters, fine dispersions and latexes as coagulation agents;

in agriculture as structurization agents for soils and grounds;

in drilling technology as protective reagents.

We claim:

1. A process for producing (co)polymers from acrylic and/or methacrylic acids, salts, esters or amide derivatives thereof, which comprises:

(a) (co)polymerizing the starting monomers in the presence of radical initiators at the decomposition temperature of said initiator until the appearance of the gel-effect and the formation of a low-molecular weight prepolymer, wherein the concentration of the starting monomers vary from about 40 to 100% by weight;

(b) cooling said prepolymer to the glass-transition temperature to yield a higher-molecular weight prepolymer with a degree of conversion of about 50 to 90%;

(c) granulating said prepolymer;

(d) treating said granulated prepolymer with a heating agent;

(e) drying and continuing polymerization of the granulated prepolymer in a fluidized bed heated with a heating agent;

(f) drying and continuing polymerization of the granulated prepolymer in a filtering bed heated with a heating agent to yield the final polymerization product.

2. The process of claim 1, wherein the starting monomers and (co)polymerized in an aqueous solution at a concentration thereof of at least 40% by weight.

3. The process of claim 1, wherein the starting monomers are (co)polymerized at a concentration thereof of about 100% by weight.

4. The process of claim 1, wherein the (co)polymerization of the starting monomers is conducted in the presence of an oxidizing-reducing initiator at a temperature of about 35° to 45° C. until the degree of conversion of the monomer to a low-molecular prepolymer is about 40 to 45%.

5. The process of claim 1, wherein the (co)polymerization is conducted in the presence of a peroxide initiator at a temperature of 55° to 90° C. until the degree of conversion of the monomer to the low-molecular prepolymer is about 23 to 27%.

6. A process according to claim 1, wherein the heating agent is air or an inert gas.

7. The process of claim 6, wherein the granulated prepolymer is treated with said heating agent at a rate of about 20–30 m/sec in a pneumatic conveyor and about 14–20 m/sec in a cyclone.

8. The process of claim 1, wherein the drying and continuing polymerization of the granulated prepolymer is conducted in the fluidized bed at a temperature of the heating agent of about 40° to 55° C.

9. The process of claim 1, wherein the drying and continuing polymerization of the granulated prepolymer is conducted in the fluidized bed at a temperature of the heating agent of about 65° to 95° C.

10. The process of claim 1, step (b), wherein said cooling is conducted at a temperature of about 34–35° C.

11. The process of claim 1, step (e), wherein the temperature in said fluidized bed varies from about 40° to 140° C.

12. The process of claim 1, step (f), wherein the temperature in said filtering bed varies from about 25° to 60° C.

13. The process of claim 7, wherein the ratio between the volume occupied by the heating agent to the volume of granules of the prepolymer is about 1:1.

14. The method of claim 1, step (e), wherein the ratio of the volume occupied by the heating agent to the volume of the bed of granules of the prepolymer varies from about 0.5:1 to 0.85:1, respectively.

15. The method of claim 1, step (f), wherein the ratio between the volume occupied by the heating agent to the volume of the bed of the prepolymer granules varies from 0.4:1 to 0.5:1, respectively.

* * * * *